United States Patent
Garcia et al.

(10) Patent No.: US 10,492,603 B2
(45) Date of Patent: Dec. 3, 2019

(54) SYSTEMS AND METHODS OF COOLING A GALLEY OF AN AIRCRAFT

(71) Applicant: THE BOEING COMPANY, Chicago, IL (US)

(72) Inventors: Emmanuel Garcia, Mukilteo, WA (US); Joshua Lee, Seattle, WA (US)

(73) Assignee: The Boeing Company, Chicago, IL (US)

(*) Notice: Subject to any disclaimer, the term of this patent is extended or adjusted under 35 U.S.C. 154(b) by 303 days.

(21) Appl. No.: 14/716,196

(22) Filed: May 19, 2015

(65) Prior Publication Data
US 2016/0338488 A1 Nov. 24, 2016

(51) Int. Cl.
| A47B 31/02 | (2006.01) |
| B64D 11/00 | (2006.01) |
| B64D 13/04 | (2006.01) |
| B64D 13/08 | (2006.01) |
| A47B 31/06 | (2006.01) |

(52) U.S. Cl.
CPC ............. *A47B 31/02* (2013.01); *A47B 31/06* (2013.01); *B64D 11/0007* (2013.01); *B64D 13/04* (2013.01); *B64D 13/08* (2013.01); *A47B 2031/023* (2013.01)

(58) Field of Classification Search
CPC .... B64D 11/0007; B64D 13/04; B64D 13/08; A47B 31/02; A47B 31/06; A47B 2031/023
USPC .................................................. 62/237, 434
See application file for complete search history.

(56) References Cited

U.S. PATENT DOCUMENTS

| 4,203,486 A * | 5/1980 | Rubbright ............. A47J 39/006 165/48.1 |
| 5,097,675 A * | 3/1992 | Elsom ................... F25D 17/045 62/408 |
| 6,845,627 B1 | 1/2005 | Buck |
| 7,231,778 B2 * | 6/2007 | Rigney .............. B60H 1/00014 62/407 |
| 9,062,909 B2 | 6/2015 | Lu et al. |
| 9,676,483 B2 * | 6/2017 | Godecker ............. B64D 11/04 |
| 2003/0042361 A1 | 3/2003 | Simadiris et al. |
| 2006/0162342 A1 * | 7/2006 | Bhatti ..................... F25B 21/02 62/3.7 |
| 2013/0047657 A1 | 2/2013 | Oswald et al. |
| 2015/0007600 A1 | 1/2015 | Godecker et al. |
| 2015/0065024 A1 | 3/2015 | Moran et al. |
| 2015/0089970 A1 * | 4/2015 | Lu .......................... F25B 1/005 62/419 |

OTHER PUBLICATIONS

Extended European Search Report for co-pending EP Application No. 16170065.3 dated Nov. 15, 2016 (7 pages).

* cited by examiner

*Primary Examiner* — Joseph F Trpisovsky
(74) *Attorney, Agent, or Firm* — Jay J. Hoette; The Small Patent Law Group, LLC

(57) ABSTRACT

A galley includes a cart compartment defining a cavity configured to store at least one galley cart. The galley includes a heat exchanger positioned within the cart compartment and a plenum coupled in flow communication with the heat exchanger. The plenum is configured to provide cool air to cool the at least one galley cart.

26 Claims, 3 Drawing Sheets

SYSTEMS AND METHODS OF COOLING A GALLEY OF AN AIRCRAFT

BACKGROUND

The present disclosure relates generally to systems and methods of cooling a galley of an aircraft.

Aircraft typically include multiple galleys to store food and beverages on the aircraft. The food and beverages are typically stored in galley carts which are transported to the aircraft and stored in refrigerated compartments or zones in the galleys. A heat exchanger is provided at the top of the galley and supplies cooled air to each of the compartments or zones via a plurality of air ducts and other components. The air ducts and the supply and return devices associated with the air ducts are routed along the back wall of the galley to the cart compartment to supply the cooled air to the cart compartment and to return the air to the heat exchanger. For example, vertical ducts may extend from the heat exchanger, located above the galley, down the back wall of the galley to the level of cart compartment, which is located at the bottom of the galley. Horizontal ducts may extend from the corresponding vertical ducts along the various galley carts to supply the air to, or return the air from, the galley carts and the cart compartment.

In some applications, the galley carts are cooled by an air-through-cart cooling arrangement where the air is supplied directly into the galley carts from the supply ducts, such as using air supply valves that interface directly to the carts. Similarly, air return valves are connected to other locations of the galley carts to remove air from the galley carts. In other applications, the galley carts are cooled by an air-over-cart cooling arrangement where air is supplied to the cart compartments and is allowed to pass over the galley carts, such as along the outside of the galley carts, to cool the galley carts. In such applications, air grills are provided in the cart compartment space to vent the air. Such valves and air grills are typically arranged behind the galley carts either in the back wall or extending into the cart compartments from the back wall.

A large amount of space is required for the airflow supply and return components, such as the ducts, supply valves, return valves, supply grills, return grills, and the like. The footprint of the galley is wide enough to accommodate the galley carts as well as the airflow supply and return components. The galleys occupy valuable space within the cabin of the aircraft, which limits the number of passenger seats that may be provided on the aircraft. For example, the airflow supply and return components may add approximately 4-5 inches (in) (10-13 centimeters (cm)) of width to the galleys, and some aircraft may have eight or more galleys, leading to a large amount of cabin space dedicated to the airflow supply and return components, which may be used for other purposes.

SUMMARY

In accordance with one embodiment, a galley is provided including a cart compartment defining a cavity configured to store at least one galley cart. The galley includes a heat exchanger positioned within the cart compartment and a plenum coupled in flow communication with the heat exchanger. The plenum is configured to provide cool air to cool the at least one galley cart.

In another embodiment, a galley for an aircraft is provided that includes a plurality of walls defining a front, a rear and sides between the front and the rear of the galley. The front faces a galley space of the aircraft and the rear facing a passenger space of the aircraft. The galley includes a cart compartment at least partially defined by the plurality of walls. The cart compartment defines a cavity below a counter of the galley. The cart compartment is configured to store at least one galley cart in the cavity. The cart compartment has a door at the front to close the cavity and the galley carts are loaded into the cavity through the door. The galley includes a heat exchanger positioned within the cart compartment. The heat exchanger has a front at the front of the galley and a rear at the rear of the galley. The heat exchanger is positioned along the corresponding galley cart(s). The galley includes a plenum coupled in flow communication with the heat exchanger that is configured to provide cool air to cool the at least one galley cart.

In a further embodiment, a cooling system is provided for use with a galley of an aircraft having a cart compartment configured to hold galley carts. The cooling system includes a heat exchanger configured to be received in the cart compartment and configured to supply cooled air to the cart compartment. The heat exchanger has a front facing a front of the galley and the heat exchanger has opposite first and second sides extending rearward from the front. The first and second sides are positioned between corresponding galley carts. The cooling system includes an airflow supply system having first and second supply ducts extending through the first and second sides for supplying cooled air to the corresponding galley carts.

The features and functions that have been discussed can be achieved independently in various embodiments or may be combined in yet other embodiments, further details of which can be seen with reference to the following description and drawings.

DETAILED DESCRIPTION

Figure 1:
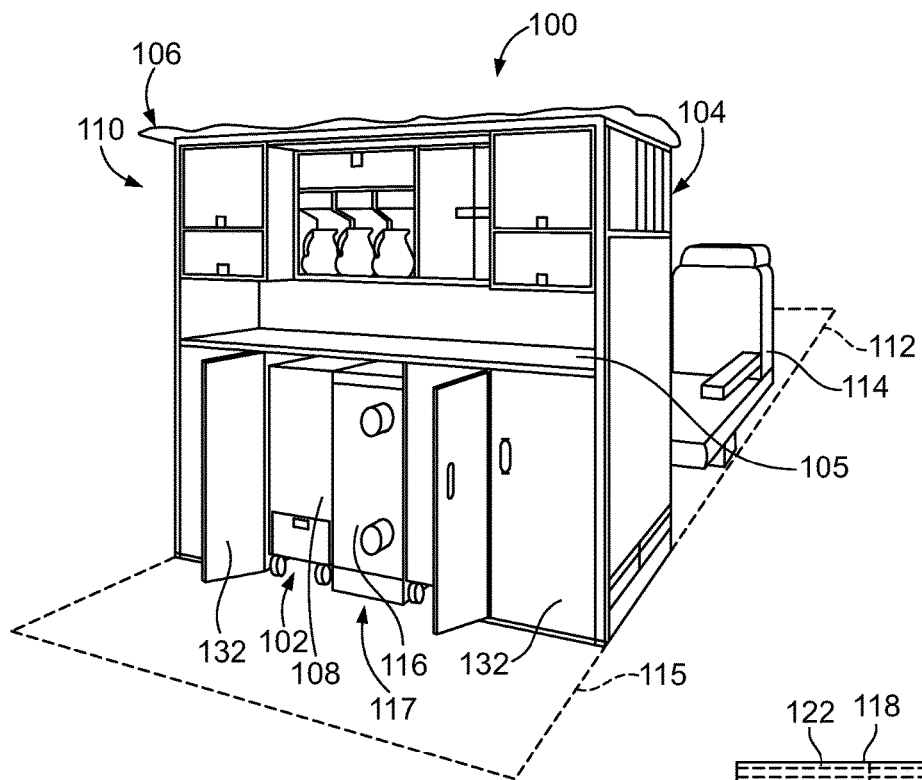
FIG. 1 is a schematic illustration of an exemplary galley system for an aircraft.

The following detailed description of certain embodiments will be better understood when read in conjunction with the appended drawings. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Described herein are various embodiments of a galley system for an aircraft configured to supply cooling air to a cart compartment of a galley monument, or simply galley, for cooling galley carts. Various embodiments provide one or more heat exchangers of the galley system that are arranged in the cart compartment to reduce a size or footprint of the galley, which may provide additional space in the passenger compartment, such as for adding additional room for passenger seating and/or leg room. For example, ducting of conventional galley systems is eliminated to reduce the depth of the galley. Various embodiments provide an efficient cooling environment for the galley carts using air-through-cart cooling arrangements and/or air-over-cart cooling arrangements.

FIG. 1 is a schematic illustration of an exemplary galley system 100 for an aircraft 106. The galley system 100 is used to cool galley carts 108 held in cart compartments 102 of a galley 104. The galley 104 defines one or more cart compartments 102, which are typically arranged below a counter 105 of the galley 104. The galley 104 is positioned within a cabin 110 of the aircraft 106, and the cabin of the aircraft 106 is divided into a passenger area 112, where passenger seats 114 are located, and a galley area 115, where the galley 104 is located. The passenger area 112 is the area exterior of the galley 104 within the aircraft 106 where passengers are able to be located. The galley area 115 has a working area for the galley crew forward of the galley 104 where the cart compartments 102, counter 105 and cabinets or storage bins may be accessed. Space dedicated to the galley 104 is unusable for passenger seats 114 or other purposes such as lavatories, and thus it may be desirable for aircraft manufacturers to reduce the footprint of the galley area 115 in order to increase the passenger area 112 to increase revenue of each flight for aircraft operators.

As used herein a cart compartment is an insulated or uninsulated volume that is utilized to store one or more galley carts on the aircraft 106. A galley cart, as used herein, is a portable device that is used to store food and/or beverages that are transported from a caterer to the aircraft 106 or from the cart compartments 102 to other parts of the aircraft 106 for serving the food and/or beverages. The galley carts may include wheels, however some galley carts may be hand carried boxes in some embodiments.

The galley 104 may include any number of cart compartments 102 and the aircraft 106 may include any number of galleys 104. The galleys 104 are typically arranged near the doors of the aircraft 106, such as at the fore and/or aft of the cabin 110, but may be located mid-cabin in some embodiments. Each cart compartment 102 may hold any number of galley carts 108. The galleys 104 may be used for the storage and/or preparation of food or beverages. Some galleys may be bar units used strictly for preparation of beverages. Some galleys may be incorporated into other monuments used for other purposes such as closets, workstations, lavatories, and the like.

The galley system 100 includes a cooling system 117 having one or more heat exchangers 116 that provides cooled air for the galley carts 108 in the cart compartment 102. The heat exchangers 116 are positioned in the cart compartment 102. The heat exchangers 116 are positioned between galley carts 108. The cooled air from the heat exchangers 116 flows directly into the cart compartments 102 and/or the galley carts 108 and the galley system 100 has no need for supply or return ducts in the rear wall of the galley 104 as with conventional galleys. Without the ducts, the galley 104 may be thinner. For example, conventional galleys may require 3-4 in (7.6-10 cm) of space for the supply and return ducts in the rear wall, such space being unnecessary in the galley 104 allowing such space to be dedicated to the passenger area 112.

In an exemplary embodiment, the elimination of supply and return ducts (as used in conventional galleys) in the back wall of the galley 104 reduces the width of the galley 104 by a significant amount. For example, the cavity depth may be reduced by at least 5%. Optionally, the cavity depth may be reduced by 10% or more. The reduced depth of the galley 104 may increase leg room of rows of passenger seats 114 behind the galley 104. Optionally, the back wall of the galley 104 may be shifted forward by 3 in (7.6 cm) or more in various embodiments. In aircraft having multiple galleys 104, reducing the footprint of multiple galleys 104 may allow additional rows of passenger seats 114 in the aircraft 106, which may increase the revenue produced by the aircraft 106.

Figure 2:
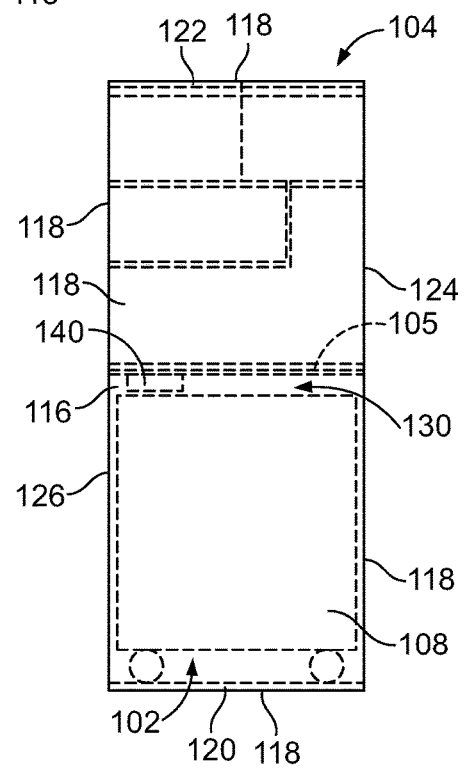
FIG. 2 is a side view of a galley in accordance with an exemplary embodiment.
Figure 3:
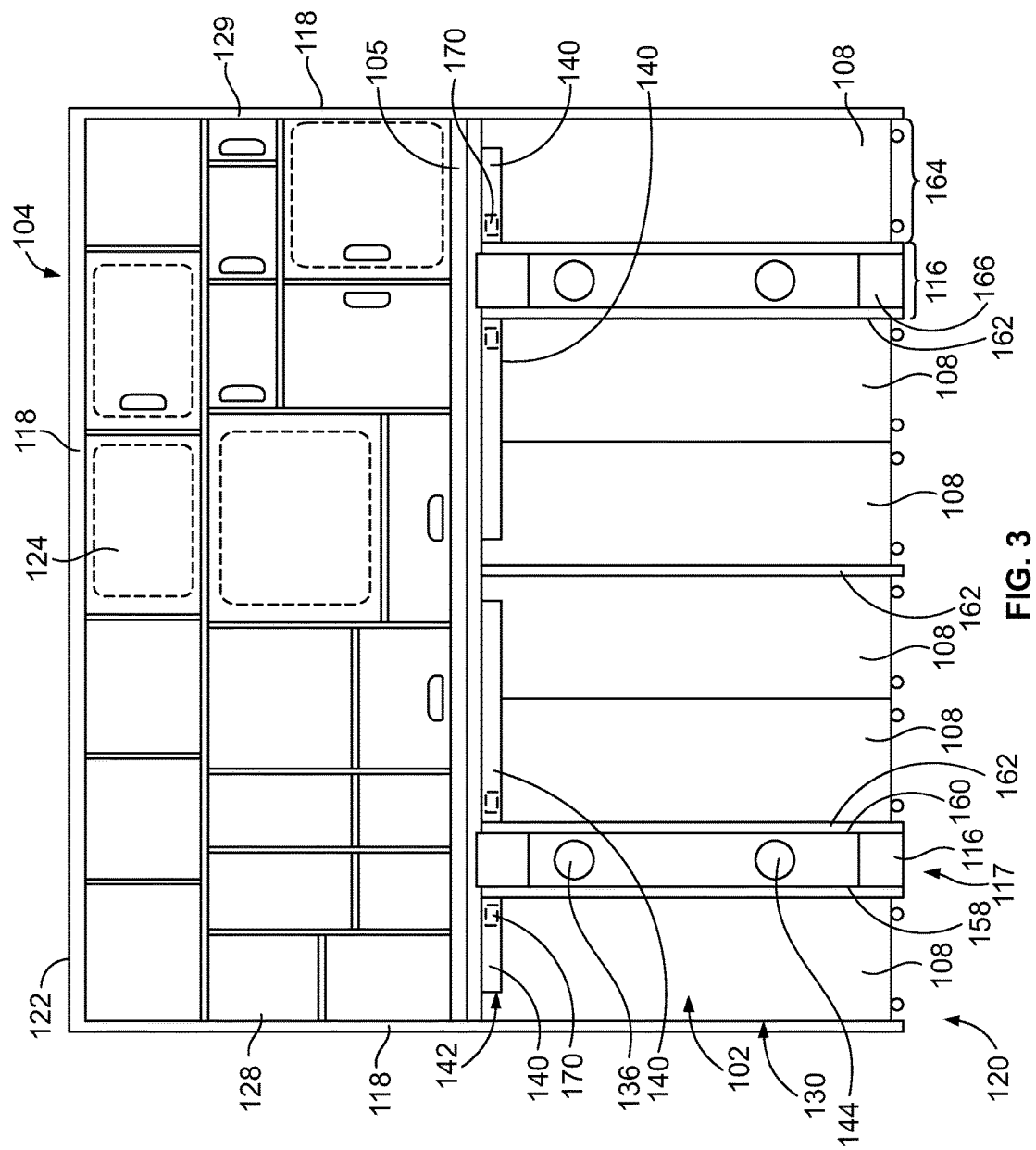
FIG. 3 is a front view of a galley in accordance with an exemplary embodiment.

FIG. 2 is a side view of the galley 104 in accordance with an exemplary embodiment. FIG. 3 is a front view of the galley 104 in accordance with an exemplary embodiment. The galley 104 includes walls 118 or partitions defining a bottom 120, a top 122, a front 124, a rear 126 opposite the front 124, and opposite sides 128, 129 (which may also be referred to as bottom wall 120, top wall 122, front wall 124, rear wall 126 and side walls 128, 129). The counter 105 extends between the sides 128, 129 at a height approximately centered between the bottom 120 and the top 122. The bottom 120 may be defined by a floor of the cabin of the aircraft. The rear 126 may be forward facing or rearward facing, depending on the orientation of the galley 104 within the cabin 110. The rear 126 may face the passenger area 112 (e.g., passenger seats 114 may be located behind the rear 126, in front of the rear 126, and the like); however in alternative embodiments, the rear 126 may be positioned against a bulkhead. In an exemplary embodiment, at least a portion of the rear 126 is shifted forward, as compared to galleys that provide airflow supply or return components along the back wall thereof, to reduce the footprint of the galley 104. For example, the rear 126 is shifted toward the front 124 and the galley carts 108 to reduce the volume of the cart compartment 102. Such reduction in volume of the cart compartment 102 equates to an increase in volume of the passenger area 112. For example, more space may be provided for passenger seats 114. For example, more leg room may be provided for passengers in the passenger seats 114. To create additional room in the cart compartment 102 for shifting the rear 126 toward the galley cart 108, at least some of the components of the airflow supply and return system of the galley 104 may be moved away from the back wall, such as to the top wall of the cart compartment 102 (e.g., the counter 105) and/or the floor. Additionally, the heat exchanger 116 is positioned in the cart compartment, such as side-by-side with the galley carts 108. At least a portion of the back wall, and in an exemplary embodiment all of the back wall, behind the galley carts 108 may be devoid of air ducts or other components of the airflow supply and return system.

The cart compartment 102 is positioned below the counter 105 and may be at least partially defined by the walls 118 of the galley 104. The cart compartment 102 defines a cavity 130 configured to receive the galley carts 108. In an exemplary embodiment, the galley 104 includes doors 132 (shown in FIG. 1) at the front 124 that close the cart compartment 102. The doors 132 are used to hold the galley carts 108 in the cart compartment 102. The doors 132 may be used to hold the cooled air in the cart compartment 102. The doors 132 may provide thermal insulation. In an exemplary embodiment, when the galley carts 108 are positioned in the cavity 130, a space is defined about the galley cart 108, such as in front of the galley carts 108, behind the galley carts 108, above the galley carts 108, and the like. Optionally, air may be able to flow around the galley carts 108 in the space.

In an exemplary embodiment, multiple heat exchangers 116 are used to cool the cart compartment 102; however in alternative embodiments a single heat exchanger 116 may be used in alternative embodiments. The heat exchangers 116 are positioned in the cart compartment 102, such as in the cavity 130. The heat exchangers 116 may be positioned between corresponding galley carts 108, such as with one or more galley carts 108 on each side of each heat exchanger 116. The heat exchangers 116 may be positioned remote from the sides 128, 129. Alternatively, the heat exchanger(s) 116 may be provided at the sides 128 and/or 129. The heat exchangers 116 supply cooled air directly to the cart compartment 102 and corresponding galley carts 108.

Figure 4:
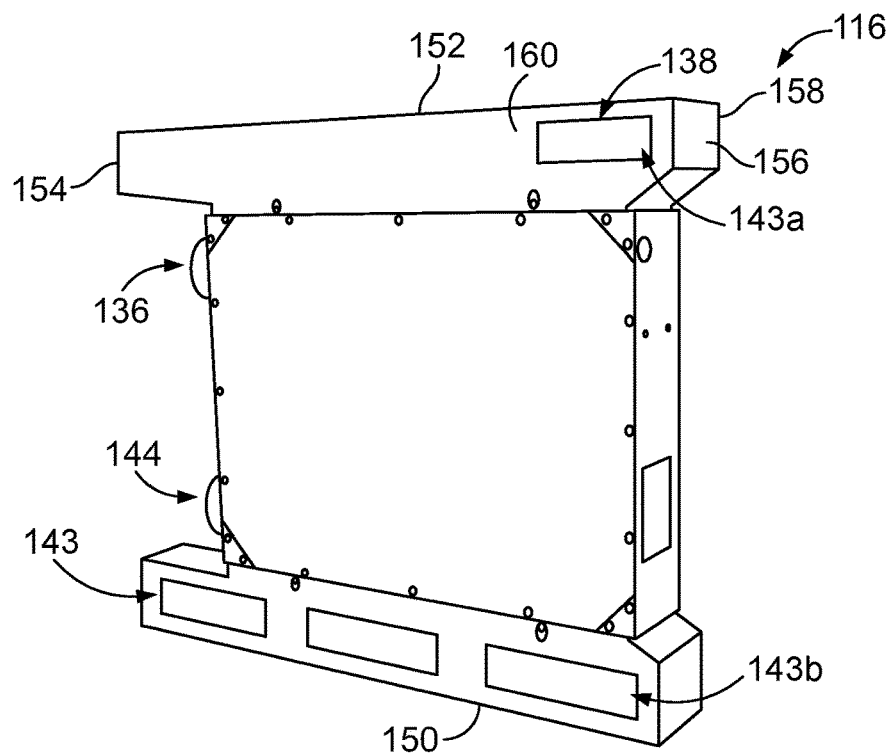
FIG. 4 illustrates a heat exchanger for the galley in accordance with an exemplary embodiment.
Figure 5:
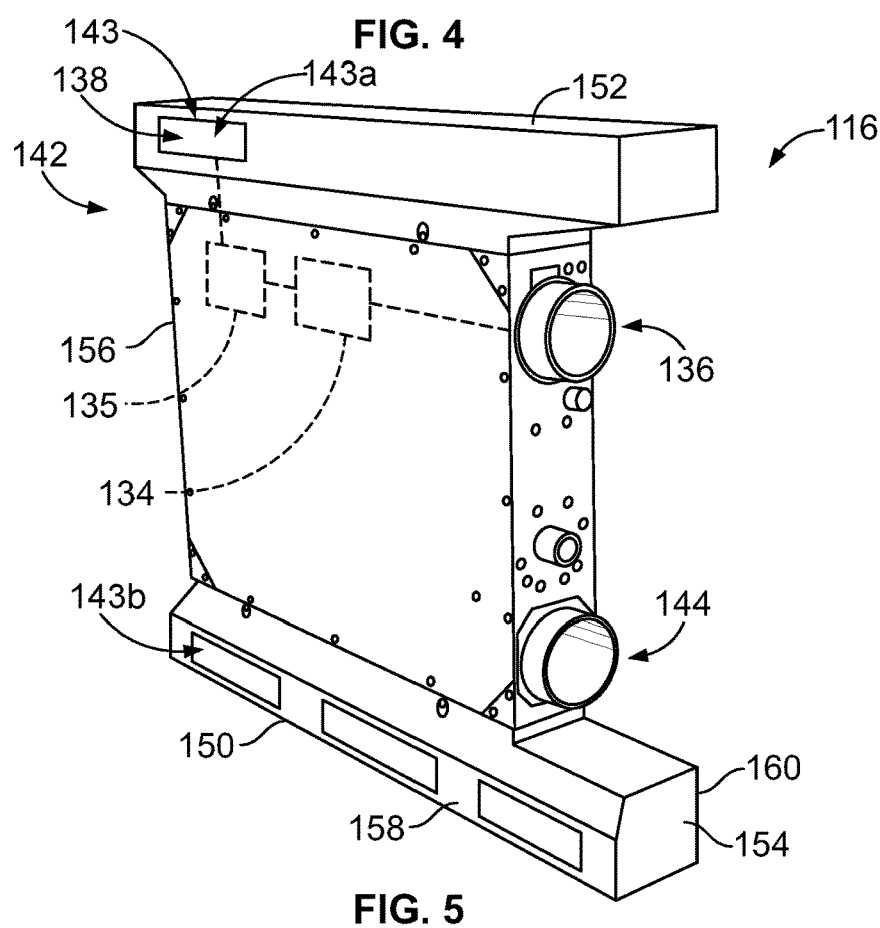
FIG. 5 illustrates a heat exchanger for the galley in accordance with an exemplary embodiment.

With additional reference to FIGS. 4 and 5, FIGS. 4 and 5 illustrate the heat exchanger 116 in accordance with an exemplary embodiment. Each heat exchanger 116 includes a fan 134 (FIG. 5) used to increase the flow of air through the galley system 100. The fan 134 may be a variable speed fan to control airflow. The fan 134 forces the airflow over a chilling unit 135 (FIG. 5) used to reduce the temperature of the airflow. The fan 134 may be positioned upstream of the chilling unit 135; however, the fan 134 may be positioned at other locations in alternative embodiments. In one embodiment, the chilling unit 135 may be a liquid-cooled chilling unit that provides chilled liquid, such as a refrigerant, to the heat exchanger 116 to cool the air supply. Heat exchanging of the liquid may be performed remote from the heat exchanger 116 and from the galley 104, such as in the belly of the aircraft 106. In another embodiment, the chilling unit 135 may be a conventional refrigeration unit, which includes an evaporator, a condenser, a compressor, and an expansion valve (not shown).

The fan 134 may be positioned between an air intake 136 and a supply duct 138 (FIGS. 4 and 5) that supplies the air to the cart compartment 102 and/or the galley cart(s) 108. In an exemplary embodiment, the supply duct 138 is in flow communication with a plenum 140 (FIG. 3) in the cart compartment 102. In an exemplary embodiment, the air intake 136 may be positioned on an exterior of the heat exchanger 116 and may intake air from a location exterior of the cart compartment 102, such as at the front 124 of the galley 104. In other embodiments, the air intake 136 may intake air from within the cavity 130 of the cart compartment 102 and/or from interior of a corresponding galley cart 108. For example, the air intake 136 may be part of an airflow return system of the galley system 100 that returns conditioned air to the heat exchanger 116.

The plenum 140 may extend at least partially into the heat exchanger 116. Alternatively, the plenum 140 may interface with the supply duct 138 at an exterior of the heat exchanger 116. Optionally, the galley 104 may include multiple supply ducts 138 and multiple plenums 140. Each plenum 140 is routed in the cart compartment 102 to one or more discharge locations, such as above corresponding galley carts 108. The plenum 140 may discharge the cool air into the cavity 130 for an air-over-cart supply arrangement. Alternatively, the plenum 140 may discharge the cool air directly into the corresponding galley cart(s) 108 for an air-through-cart supply arrangement. In an exemplary embodiment, the plenum 140 is not located behind the galley carts 108, which would add depth to the galley 104 to accommodate the plenum 140, but rather is located above the galley carts 108.

The air intake 136, the supply duct 138 and the plenum 140 define supply components of an airflow supply system 142 of the cooling system 117. Other supply components may be provided to direct the cooled airflow into the cavity 130 of the cart compartment 102 and/or into the galley carts 108. In an exemplary embodiment, the components of the airflow supply and return system of the heat exchanger 116 are routed in areas to reduce a depth of at least a portion of the galley 104. For example, the ducts and plenums of the airflow supply and return system may be routed to locations other than the rear of the cart compartment 102 or behind the galley carts 108 to reduce the depth of the galley 104, which may decrease the footprint of the galley area 115 (FIG. 1), and thus increase the footprint of the passenger area 112 (FIG. 1).

In an exemplary embodiment, the airflow supply system 142 may include airflow devices 143, such as air supply devices 143a and/or air return devices 143b. For example, the airflow devices 143 may be provided at the discharge locations of the plenum 140 and/or at the supply ducts 138. The air return devices 143b may be provided at the side of the heat exchanger 116 to define a return flow path for return air to the heat exchanger 116. The air supply devices 143a may be in flow communication with the supply duct 138 and/or the plenum 140. In various embodiments, the airflow devices 143 may be cart valves configured to engage and/or mate with the corresponding galley carts 108. For example, the airflow device 143 may seal to a vent of the galley cart 108 to provide a flow of air through a vent of the galley cart 108. Cooling airflow is configured to be supplied to the galley cart 108 through the air supply device 143a. In other embodiments, the airflow device 143 may be air grills through which air is able to flow. The air grill does not necessarily engage any galley cart 108 but rather may be positioned within the space around the galley carts 108 to direct air into, or receive air from, the cavity 130.

In an exemplary embodiment, the heat exchanger 116 includes an exhaust 144 configured to exhaust warmed air from the heat exchanger 116. For example, the exhaust 144 may be positioned at the front 124 of the galley 104. The exhaust 144 may exhaust the warmed air into the galley work space forward of the front 124 of the galley 104. The exhaust 144 may receive warmed air from within the heat exchanger 116, from within the cavity of the cart compartment 102 and/or from within the interior of a corresponding galley cart 108. The warm exhaust air may heat the galley work space, which may need warming due to cool air leakage from the cart compartment 102 through the doors 132. As such, a separate heater does not need to be provided at the galley work space, as is typical with conventional galleys, eliminating the cost and the weight of such separate, dedicated heater.

The heat exchanger 116 includes a plurality of walls defining a bottom 150, a top 152, a front 154, a rear 156 opposite the front 154, and opposite first and second sides 158, 160 (which may also be referred to as bottom wall 150, top wall 152, front wall 154, rear wall 156 and side walls 158, 160). The walls contain the components of the heat exchanger, such as the fan 134, the chilling unit 135, the ducts defining the air intake 136, the supply duct 138, the plenum 140, the exhaust 144 and the like. Optionally, the heat exchanger 116 may be box-shaped with generally perpendicular walls; however the heat exchanger 116 may have any shape. The bottom 150 is configured to rest on the bottom 120 of the galley, such as on the floor. The bottom 150 may have wheels or rails allowing the heat exchanger 116 to be removed from the cart compartment 102, such as for maintenance, repair or replacement.

In an exemplary embodiment, the heat exchanger 116 is located in the cart compartment 102 such that the heat exchanger 116 is positioned between corresponding galley carts 108. The heat exchanger 116 is in line with and stands side-by-side with the galley carts 108, which reduces the overall depth of the galley 104 (e.g., between the front 124 and the rear 126). Optionally, the heat exchanger 116 may have an overall depth (e.g., between the front 154 and the rear 156) that is approximately equal to or less than the depth of the galley carts 108. The rear 156 faces the rear 126 of the galley 104 and may be provided at the rear 126. The front 154 faces the front 124 of the galley 104 and may be provided at the front 124. A door may close off or hide the front 154, and such door may include vents for the air intake 136, the exhaust 144 or other components. The top 152 faces the counter 105 and may be provided immediately below the counter 105. The sides 158, 160 face corresponding galley carts 108 and the galley carts 108 may abut against the sides 158, 160. The supply ducts 138 may be open at the sides 158, 160. The plenum(s) 140 may attach to the heat exchanger 116 at the sides 158, 160, such as at or near the top 152. Alternatively, the plenum(s) 140 may extend through the sides 158, 160 to interface with the supply ducts 138. The plenum(s) 140 provide the cool air to the cavity 130 and/or the galley carts 108 through the first and second sides 158, 160.

During use, flow of air through the airflow supply system 142 flows through the air supply duct 138, through the plenum 140 and into the cavity 130 and/or the corresponding galley cart 108. The air passes over the food or beverages in the galley cart 108, such as by an air-through-cart supply arrangement or an air-over-cart supply arrangement. The air from the galley cart 108 and/or the cavity 130 then flows through a vent to be exhausted or used to return to the heat exchanger 116. The door 132 closes the cavity 130 to define an enclosed space and contain the air in the space. The air is able to flow around the outside of the galley cart 108 within the space in an air-over-cart supply arrangement to the return vent or exhaust 144.

Optionally, the cart compartment 102 may include divider walls 162 (FIG. 3) therein dividing the cavity 130 into a plurality of cart chambers 164 and/or heat exchanger chambers 166. The divider walls 162 may extend parallel to the sides 128, 129. The divider walls 162 may extend substantially entirely between the front 124 and the rear 126. Each cart chamber 164 receives a corresponding galley cart 108 (and may receive more than one galley cart 108). Each heat exchanger chamber 166 receives a corresponding heat exchanger 116. The heat exchanger 116 supplies cool air to the corresponding cart chamber(s) 164. Optionally, each heat exchanger 116 may supply cool air to multiple cart chambers 164. Optionally, each heat exchanger 116 may supply cool air to one or more cart chambers 164 at both sides 158, 160. The plenum 140 extends from the heat exchanger 116 to the corresponding cart chambers 164 to supply cool air to the corresponding galley carts 108 in the cart chambers 164. In alternative embodiments, the galley 104 may only include the walls defining the sides 128, 129 of the galley 104 and may be devoid of internal divider walls separating the cavity 130 into the chambers.

In an exemplary embodiment, the galley 104 includes a flow control device 170 (FIG. 3) for controlling the flow of cool air into/out of the heat exchanger 116. For example, the flow control device 170 may control the flow of cool air through the plenum(s) 140. Optionally, multiple flow control devices 170 may be provided, such as one flow control device 170 for each plenum 140, one flow control device 170 for each discharge point from the plenum 140, one flow control device 170 for each galley cart 108, and the like. In an exemplary embodiment, the flow control device 170 may include a louver for throttling an amount of cool air flowing through the plenum 140. Other types of flow control devices 170 may be used in alternative embodiments. For example, the flow control device 170 may include a valve. The flow control device 170 may include a plate having at least one opening. The plate may be moveable to adjust a position of the at least one opening relative to the plenum 140 to control an amount of cool air flowing through the plenum, such as by aligning more or less of the opening with the plenum 140 or by aligning greater or fewer openings with the plenum 140 to control the airflow.

The flow control device 170 may be mechanically actuated to control the flow of cool air. For example, an actuator, slider, button, plate or other structure may be accessible at the galley 104, such as above the counter 105, at the front 124 or elsewhere for an operator to manually move the flow control device 170 or a portion of the flow control device 170 to control the flow of cool air through the airflow supply system 142. In other embodiments, the flow control device 170 may be electrically actuated to control the flow of cool air. For example, a motor may control positioning of the flow control device 170.

In the illustrated embodiment, the plenum 140 is positioned above the galley carts 108. Having the plenum 140 above the galley carts 108, as opposed to along the back wall of the galley, allows the back wall to be shifted forward toward the galley carts 108 to realize gained space in the passenger area 112. In alternative embodiments, the plenum 140 may be positioned below the galley carts 108, such as in or along the floor.

A galley system is provided for an aircraft that supplies cooling air to a cart compartment of a galley for cooling galley carts. The heat exchanger and airflow supply and/or return components are arranged to reduce a size or footprint of the galley. Additional space is provided in the passenger compartment by shifting the walls of the cart compartment forward (e.g., closer to the galley cart), such as for adding additional room for passenger seating and/or leg room. Optionally, the heat exchangers are positioned in line with the galley carts to eliminate routing of supply and return ducts in the back wall and reduce the depth of the galley. Space that would have otherwise been needed for the supply and return ducts of conventional galleys having the heat exchanger located above the galley with duct work extending to the cart compartment is no longer required, allowing the back wall to shift forward, such as to allow more leg room for the row of passenger seats.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from the scope thereof. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A galley for an aircraft, the galley comprising:
a cart compartment defined by a plurality of walls in a galley space of the aircraft, the plurality of walls including a top wall, a bottom wall, side walls, and a rear wall opposite a front of the cart compartment defining a cavity configured to store at least one galley cart having a galley cart front and a galley cart rear, the rear wall of the cart compartment located behind the galley cart rear of the at least one galley cart;
a cooling system having a heat exchanger positioned within the cart compartment, the heat exchanger having a front facing the front of the cart compartment and a rear facing the rear wall of the cart compartment; and
an airflow supply system having a plenum coupled in flow communication with the heat exchanger, the plenum having an air supply device having at least one airflow opening at an air discharge location in the cart compartment discharging air either directly into the cart compartment or directly into the at least one galley cart through the at least one airflow opening of the air supply device at the air discharge location, the plenum contained in the cart compartment with the airflow opening of the air supply device located forward of the rear of the heat exchanger and forward of the galley cart rear of the at least one galley cart, the plenum configured to provide cool air to cool the at least one galley cart;
wherein the rear wall of the cart compartment and the cavity of the cart compartment behind the galley cart rear of the at least one galley cart are devoid of the heat exchanger and the airflow supply system.

2. The galley of claim 1, wherein the heat exchanger is positioned between corresponding galley carts.

3. The galley of claim 1, wherein the heat exchanger extends between the front and rear of the cart compartment, the rear of the heat exchanger abutting the rear of the cart compartment.

4. The galley of claim 1, further comprising a counter above the cart compartment, the heat exchanger positioned below the counter.

5. A galley for an aircraft, the galley comprising:
a cart compartment defined by a plurality of walls in a galley space of the aircraft, the cart compartment defining a cavity configured to store at least one galley cart having a rear wall behind the at least one galley cart;
a cooling system having a heat exchanger positioned within the cart compartment, the heat exchanger having a front and a rear, the heat exchanger includes an exhaust duct configured to exhaust warmed air into a galley space forward of a front of a galley; and
an airflow supply system having a plenum coupled in flow communication with the heat exchanger, the plenum contained in the cart compartment forward of the rear of the heat exchanger, the plenum configured to provide cool air to cool the at least one galley cart;
wherein the rear wall and the cavity behind the at least one galley cart are devoid of the heat exchanger and the airflow supply system.

6. The galley of claim 1, wherein the plenum directs air into the cavity for an air-over-cart supply arrangement.

7. The galley of claim 1, wherein the plenum directs air into the at least one galley cart for an air-through-cart supply arrangement.

8. The galley of claim 1, wherein the heat exchanger includes a side between the front and the rear, the side facing the cavity and the corresponding at least one galley cart.

9. The galley of claim 8, wherein the plenum extends through the side.

10. The galley of claim 8, wherein the heat exchanger includes a second side facing the cavity and the corresponding at least one galley cart, the plenum providing cool air to the cavity at the second side.

11. The galley of claim 1, wherein the cart compartment includes divider walls dividing the cavity into a plurality of cart chambers, each cart chamber receiving a corresponding galley cart, the heat exchanger supplying cool air to a plurality of the cart chambers.

12. The galley of claim 11, wherein the plenum extends from the heat exchanger to corresponding cart chambers to supply cool air to the corresponding galley carts in the cart chambers.

13. The galley of claim 1, further comprising a flow control device having a throttling surface configured to control the flow of cool air through the plenum.

14. The galley of claim 13, wherein the flow control device is mechanically actuated to control the flow of cool air.

15. The galley of claim 13, wherein the flow control device is electrically actuated to control the flow of cool air.

16. The galley of claim 13, wherein the flow control device comprises a louver for throttling an amount of cool air flowing through the plenum.

17. The galley of claim 13, wherein the flow control device comprises a plate having at least one opening, the plate being moveable to adjust a position of the at least one opening relative to the plenum to control an amount of cool air flowing through the plenum.

18. The galley of claim 1, wherein the airflow supply system includes at least one supply duct for supplying cooled air to the at least one galley cart.

19. A galley for an aircraft, the galley comprising:
a cart compartment defined by a plurality of walls in a galley space of the aircraft, the cart compartment defining a cavity configured to store at least one galley cart having a rear wall behind the at least one galley cart;
a cooling system having a heat exchanger positioned within the cart compartment, the heat exchanger having a front and a rear, wherein the heat exchanger includes an exhaust at the front of the heat exchanger configured to exhaust warmed air into the galley space forward of a front of the galley; and
an airflow supply system having a plenum coupled in flow communication with the heat exchanger, the plenum having an air supply device having at least one airflow opening at an air discharge location in the cart compartment, the plenum contained in the cart compartment forward of the rear of the heat exchanger, the plenum configured to provide cool air to cool the at least one galley cart;

wherein the rear wall and the cavity behind the at least one galley cart are devoid of the heat exchanger and the airflow supply system.

20. The galley of claim 18, further comprising a flow control device having a throttling surface configured to control flow of the cooled air through the airflow supply system, the flow control device being configured to control an amount of the cooled air discharged from the at least one supply duct.

21. A galley for an aircraft, the galley comprising:
a cart compartment defined by a plurality of walls in a galley space of the aircraft, the plurality of walls including a top wall, a bottom wall, side walls, and a rear wall opposite a front of the cart compartment defining a cavity configured to store at least one galley cart having a galley cart front, a galley cart rear, and a galley cart side between the galley cart front and the galley cart rear, the rear wall of the cart compartment located behind the galley cart rear of the at least one galley cart;
a cooling system having a heat exchanger positioned within the cart compartment, the heat exchanger having a front facing the front of the cart compartment, a rear facing the rear wall of the cart compartment, and a first side extending between the front and the rear facing the galley cart side of the at least one galley cart; and
an airflow supply system having a supply duct coupled in flow communication with the heat exchanger, the supply duct provided at the first side of the heat exchanger forward of the rear of the heat exchanger, the supply duct extending from the first side of the heat exchanger into the cart compartment, the supply duct having an air discharge location in the cart compartment to the first side forward of the rear of the heat exchanger facing the galley cart side of the at least one galley cart, the supply duct configured to provide cool air to cool the at least one galley cart;

wherein the rear wall of the cart compartment and the cavity of the cart compartment behind the galley cart rear of the at least one galley cart are devoid of the heat exchanger and the airflow supply system.

22. The galley of claim 21, further comprising a plenum in flow communication with the supply duct and receiving cool air from the supply duct.

23. The galley of claim 21, wherein the heat exchanger has a second side opposite the first side, the airflow supply system having a second supply duct at the second side.

24. The galley of claim 21, wherein the rear of the heat exchanger abuts against a rear of the cart compartment.

25. A galley for an aircraft, the galley comprising:
a cart compartment defined by a plurality of walls in a galley space of the aircraft, the cart compartment defining a cavity configured to store at least one galley cart having a rear wall behind the at least one galley cart;
a cooling system having a heat exchanger positioned within the cart compartment, the heat exchanger having a front, a rear, and a first side extending between the front and the rear facing the at least one galley cart, wherein the heat exchanger includes an exhaust duct at the front configured to exhaust warmed air into a galley space forward of a front of a galley; and
an airflow supply system having a supply duct coupled in flow communication with the heat exchanger, the supply duct provided at the first side of the heat exchanger forward of the rear of the heat exchanger, the supply duct extending from the first side of the heat exchanger into the cart compartment, the supply duct configured to provide cool air to cool the at least one galley cart;
wherein the rear wall and the cavity behind the at least one galley cart are devoid of the heat exchanger and the airflow supply system.

26. The galley of claim 21, wherein the supply duct directs air into the cavity for an air-over-cart supply arrangement.

* * * * *